(12) United States Patent
Komatsu et al.

(10) Patent No.: US 7,223,086 B2
(45) Date of Patent: May 29, 2007

(54) GOLF BALL MANUFACTURING APPARATUS

(75) Inventors: Satoru Komatsu, Kobe (JP); Teruo Kajiwara, Kobe (JP)

(73) Assignee: SRI Sports Limited, Kobe-shi (JP)

( * ) Notice: Subject to any disclaimer, the term of this patent is extended or adjusted under 35 U.S.C. 154(b) by 344 days.

(21) Appl. No.: 10/883,779

(22) Filed: Jul. 6, 2004

(65) Prior Publication Data

US 2005/0079238 A1  Apr. 14, 2005

(30) Foreign Application Priority Data

Oct. 10, 2003  (JP) .............................. 2003-351459

(51) Int. Cl.
*B29C 45/14* (2006.01)
*B29C 45/18* (2006.01)

(52) U.S. Cl. .................. 425/129.1; 425/215; 425/217; 425/585; 425/587

(58) Field of Classification Search ............. 425/129.1, 425/215, 217, 585, 587; 264/37.29, 37.3, 264/37.33

See application file for complete search history.

(56) References Cited

U.S. PATENT DOCUMENTS

| | | | | |
|---|---|---|---|---|
| 1,834,670 A | * | 12/1931 | Yett | 105/248 |
| 3,000,055 A | * | 9/1961 | Michael | 425/202 |
| 3,797,761 A | * | 3/1974 | Neil | 241/34 |
| 4,063,860 A | * | 12/1977 | Cushing | 425/202 |
| 4,108,334 A | * | 8/1978 | Moller | 222/136 |
| 4,148,100 A | * | 4/1979 | Moller | 366/156.1 |
| 4,443,109 A | * | 4/1984 | Watts | 366/134 |
| 4,714,573 A | * | 12/1987 | Yoshida | 264/37.33 |
| 4,955,550 A | * | 9/1990 | Satake et al. | 241/101.4 |
| 5,061,167 A | * | 10/1991 | Hehl | 425/188 |
| 5,110,521 A | * | 5/1992 | Moller | 264/40.4 |
| 5,261,743 A | * | 11/1993 | Moller | 366/196 |
| 5,282,548 A | * | 2/1994 | Ishihara | 222/55 |

FOREIGN PATENT DOCUMENTS

| | | | |
|---|---|---|---|
| DE | 2004015639 U1 | * | 1/2005 |
| JP | 07088843 A | * | 4/1995 |
| JP | 2001-145708 A | | 5/2001 |

OTHER PUBLICATIONS

Partial machine translation of JP 07-088,843 A.*
Partial machine translation of JP 2001-145,708 A.*

* cited by examiner

*Primary Examiner*—Robert B. Davis
(74) *Attorney, Agent, or Firm*—Birch, Stewart, Kolasch & Birch, LLP

(57) ABSTRACT

A golf ball manufacturing apparatus comprises a mold including a cavity for forming a golf ball, an injection molding machine for supplying a molten resin to the mold, a supply portion for supplying a resin pellet to the injection molding machine, and a crushing machine for crushing a residue discharged from the mold, thereby fabricating a regenerating pellet. The supply portion includes a main cylinder (11), a cylinder (13) for a regenerating pellet and a cylinder (15) for a virgin pellet which branch upward. An inclination angle (u) to a vertical line of the cylinder (13) is equal to or smaller than 20 degrees. An inclination angle (f3) to a vertical line of the cylinder (15) is 30 to 60 degrees. The crushing machine is coupled to the cylinder (13), and the regenerating pellet is transferred to the main cylinder (11) through the cylinder (13).

4 Claims, 5 Drawing Sheets

(a)

35

(b)

31

GOLF BALL MANUFACTURING APPARATUS

This Non-provisional application claims priority under 35 U.S.C. § 119(a) on Patent Application No(s). 2003-351459 filed in Japan on Oct. 10, 2003, the entire contents of which are hereby incorporated by reference.

BACKGRANULATE OF THE INVENTION

1. Field of the Invention

The present invention relates to a golf ball manufacturing apparatus.

2. Description of the Related Art

A golf ball is usually formed by covering a mid layer of a thermoplastic resin or an outer layer such as a cover of a thermoplastic resin with a core by means of a mold. At this forming step, an excess material (a residue) such as a spew composed of a remaining material is generated when the outer layer is formed. The residue is granulated like a pellet by means of a crushing machine after it is collected to reach a certain amount. A place for storing the residue is required for the collection. The pellet thus granulated is reused together with an unused virgin resin pellet.

The residue is mixed at a constant rate so as to be stably molten and processed. A great deal of time and labor is required for a storage control, a measurement and the like for the mixture, and a process is also complicated. A moisture is absorbed while the residue is stored. By the moisture absorption, a change is generated, that is, when a mixed resin pellet is subjected to injection molding, it is poorly pulled into the screw of an injection molding machine. Due to such a change in the flow of the resin, a molding failure such as a beard or a weld is generated in a hold pin portion.

In case of a general processed resin product, a regenerated resin is used without particularly caring about a mixing ratio to a virgin resin. In the golf ball, however, the uniformity of a material to be used is influenced in respect of a performance such as a resilience performance or a durability. Therefore, the mixing ratio is controlled. Japanese Laid-Open Patent Publication No. 2001-145708 has described that the residue may be mixed into a virgin resin in a mixing ratio of 50% or less. Also in this publication, the moisture absorption of a regenerated resin and a fluidity in a mold have been mentioned. However, the stabilization of a process, an improvement in equipment and the like have not been mentioned.

On the other hand, more materials have increasingly been used for the golf ball in recent years. Consequently, a control has been more required for handling such as a storage. The requirement level for a reduction in a thickness and a uniformity has also been more raised for the cover of the golf ball.

In consideration of the circumstances, it is an object of the present invention to provide an inexpensive manufacturing apparatus capable of preventing much space from being occupied, enhancing a manufacturing efficiency and manufacturing a golf ball of high quality.

SUMMARY OF THE INVENTION

A golf ball manufacturing apparatus according to the present invention comprises a mold including a cavity for forming a golf ball, an injection molding machine for supplying a molten resin to the mold, a supply portion for supplying a resin pellet to the injection molding machine, and a crushing machine for crushing a residue discharged from the mold, thereby preparing a regenerating pellet. Furthermore, the supply portion includes a main cylinder, and a cylinder for a regenerating pellet and a cylinder for a virgin pellet which branch upward from the main cylinder, an inclination angle α to a vertical line of the cylinder for a regenerating pellet is equal to or smaller than 20 degrees, an inclination angle β to a vertical line of the cylinder for a virgin pellet is 30 to 60 degrees, and the crushing machine is coupled to the cylinder for a regenerating pellet, and the regenerating pellet is transferred to the main cylinder through the cylinder for a regenerating pellet.

In the golf ball manufacturing apparatus, it is more preferable that an angle θ formed by the cylinder for a regenerating pellet and the cylinder for a virgin pellet should be 20 to 70 degrees.

In the golf ball manufacturing apparatus, furthermore, it is preferable that the cylinder for a virgin pellet should be provided with a detecting device for detecting a residual amount of a virgin pellet.

In the golf ball manufacturing apparatus, the residue is steadily used at a predetermined rate. Therefore, the residue does not stay but is used each residue as it is generated. The residue has no change in a moisture absorption during a storage, and therefore, is caused to flow in a constant amount to the process. The flow of the resin of the golf ball to be formed can be stabilized and the uniformity of quality can also be maintained. By this process, a place for processing the regenerated resin can be saved. Since a large-scaled control apparatus is not required, manufacture and installation can be carried out inexpensively. A manufacturing process and a manufacturing efficiency can also be enhanced.

DESCRIPTION OF THE PREFERRED EMBODIMENTS

The present invention will be described below in detail based on a preferred embodiment with reference to the drawings.

Figure 1:
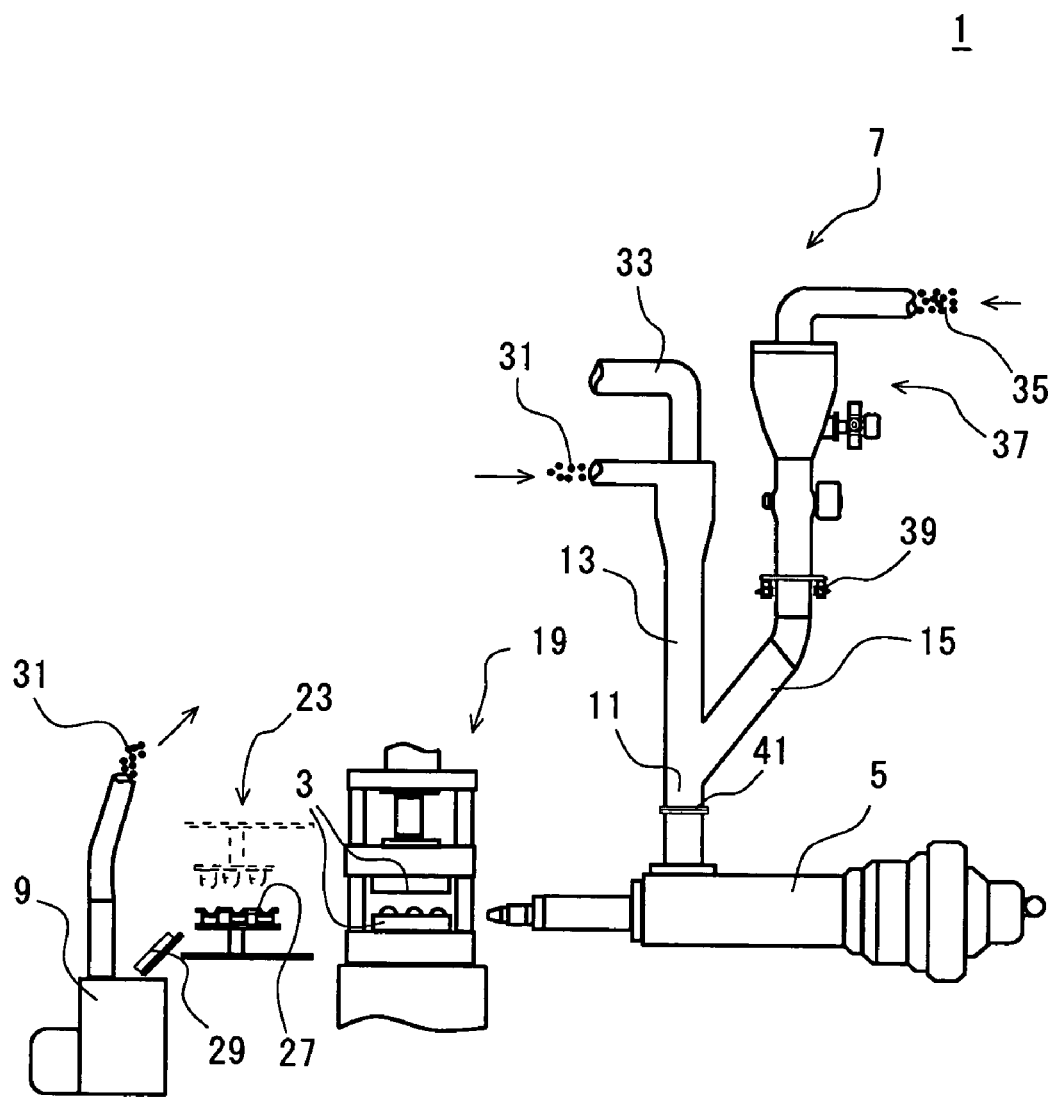
FIG. 1 is a front view showing a golf ball manufacturing apparatus according to an embodiment of the present invention.
Figure 2:
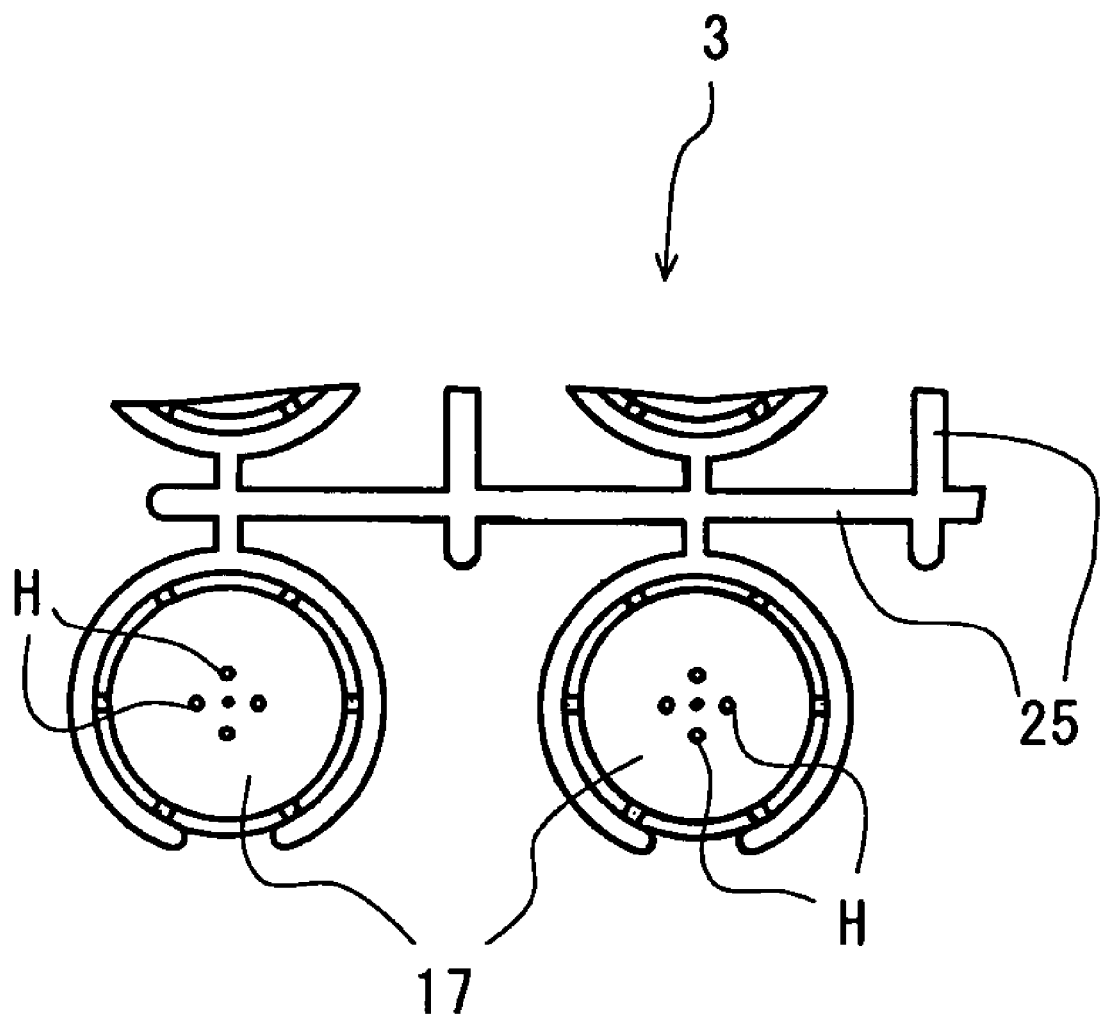
FIG. 2 is a plan view showing a part of a mold for forming the golf ball.

A manufacturing apparatus 1 shown in FIGS. 1 and 2 comprises a mold 3, an injection molding machine 5, a supply portion 7 and a crushing machine 9. The supply portion 7 includes a main cylinder 11, and a cylinder 13 for a regenerating pellet and a cylinder 15 for a virgin pellet which branch upward from the main cylinder 11. The crushing machine 9 is coupled to the cylinder 13 for a regenerating pellet. The golf ball manufacturing apparatus 1 comprises equipment for handling or controlling a material and a product together with or separately from these units.

The mold 3 has an upper mold half and a lower mold half, each of which has a plurality of semispherical cavities 17. Each of the cavities 17 of the mold 3 has a dimple which is not shown. The upper and lower mold halves are united to form a cavity taking the shape of a golf ball. The mold 3 is divided vertically and is thus attached to a press machine 19. A core is put into the cavity of the lower mold half. The core is put in by means of a handling device 23 having an intake function as partially typically shown in FIG. 1.

The core thus put in is supported on a hold pin in the cavity 17 and the press machine 19 is driven so that the upper mold half is brought down over the lower mold half and both of the cavities 17 are thus closed. At this time, a molten resin is supplied from the injection molding machine 5 into the cavity 17 so that it is filled between the core and the wall surface of the cavity 17. As shown in FIG. 2, the molten resin passes through a groove 25 provided like a branch and is then injected into the cavities 17. The molten resin surrounds the core while sending out air in the groove 25, the cavity and the surface of the core. When the molten resin is filled in and the core is surrounded by the molten resin, the hold pin is retreated into a hold pin hole H of the cavity 17. The core is completely covered with the molten resin so that a cover is formed. The molten resin is injected. For this reason, the molten resin is injected in a larger amount than the amount of the resin by which the cover is formed. Thus, a molded product formed by the mold 3 is delivered to a cutter (not shown) by means of the handling device 23 so that the ball is cut away.

An excess resin cut away from the golf ball by means of the cutter is set to be a resin for regeneration. The resin for regeneration will be referred to as a residue. A residue 27 is transferred to a chute 29 by means of the handling device 23 and is put from the chute 29 into the crushing machine 9. The residue 27 thus put in is granulated by the crushing machine 9. The crushing machine 9 is provided with a filter which is not shown. A pellet-like granulated piece having a constant size or less passes through the filter. The pellet-like granulated piece passing through the filter is delivered as a regenerating pellet 31 from the crushing machine 9 in a hose through an air flow. By the air delivery, the regenerating pellet 31 is transported to the cylinder 13 for a regenerating pellet.

The crushing machine 9 has a capability for sufficiently processing, in one cycle, the residue 27 generated during the injection molding in the same cycle. In the crushing machine 9, the residue 27 corresponding to one cycle is sent out as the regenerating pellet 31 in an almost equal amount thereto. In other words, the residue 27 remaining on the filter in a last cycle passes into a subsequent cycle, while a residue which does not pass through the filter is generated at random in the subsequent cycle. When the crushing machine 9 is steadily operated in the cycle, the amount of the regenerating pellet 31 transferred every cycle becomes averagely constant. The crushing machine 9 is always operated during the operation of the process also in a molding cycle.

The regenerating pellet 31 is transferred to the top of the cylinder 13 for a regenerating pellet by the air delivery, and is dropped into the cylinder 13 for a regenerating pellet. The air used for the delivery is discharged to an upper part through an exhaust portion 33 of the cylinder 13 for a regenerating pellet. The dust resin of the regenerating pellet contained in the air discharged to the upper part is collected into a collecting box (not shown) in order to prevent an air pollution. In the cylinder 13 for a regenerating pellet, a special device for forcibly delivering the regenerating pellet 31 is not used but the regenerating pellet 31 is transported by a gravity. If the device is set without special restrictions or the like, the cylinder 13 for a regenerating pellet is usually provided almost vertically.

On the other hand, a virgin pellet 35 to be an unused granular raw material resin is sent from a resin deliver-in portion 37 of the supply portion 7 into the cylinder 15 for a virgin pellet. During the operation of the golf ball manufacturing apparatus 1, the virgin pellet 35 is steadily supplied to the cylinder 15 for a virgin pellet. Thus, the regenerating pellet 31 and the virgin pellet 35 reach the main cylinder 11 of the supply portion 7. In a steady state, a resin pellet formed by mixing, at a constant rate, the virgin pellet 35 and the regenerating pellet 31 in a smaller amount is prepared in the main cylinder 11 in order to carry out injection molding. In order to steadily carry out the mixture at a constant rate, the inclination angle of the cylinder 15 for a virgin pellet is also important.

Figure 3:
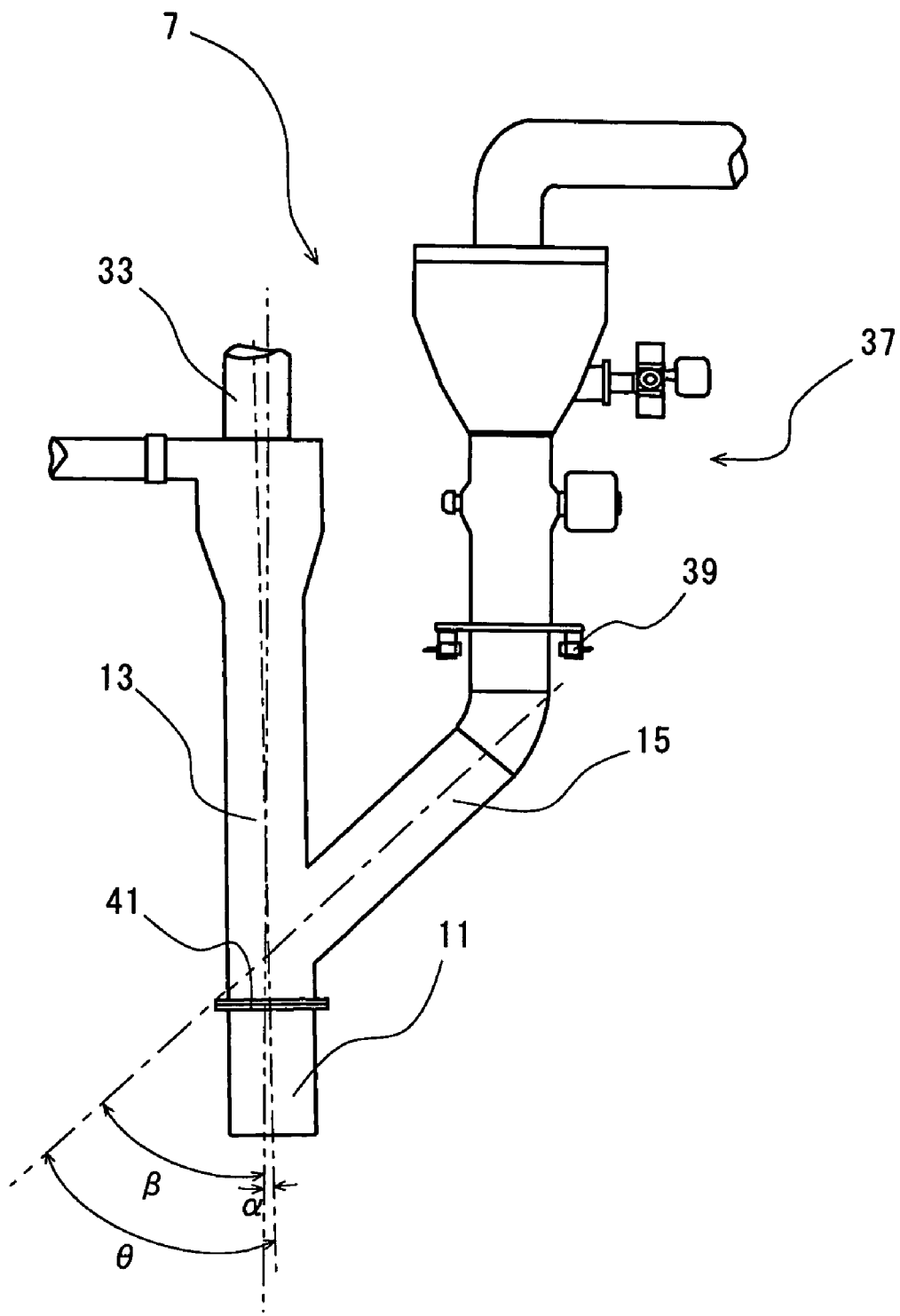
FIG. 3 is a partial front view showing a supply portion 7 in FIG. 1.

FIG. 3 is a front view showing the supply portion 7 in FIG. 1. As shown in FIG. 3, an inclination angle $\alpha$ to the vertical line of the cylinder 13 for a regenerating pellet is set to be equal to or smaller than 20 degrees in such a manner that the regenerating pellet 31 does not cause jamming in the middle of the cylinder. In some cases in which the angle $\alpha$ is greater than 20 degrees, bridge-like jamming referred to as a bridge is caused by a static electricity or the like. From this viewpoint, it is more preferable that the inclination angle to the vertical line of the cylinder 13 for a regenerating pellet should be equal to or smaller than 10 degrees, and it is further preferable that the same angle should be equal to or smaller than 5 degrees. Referring to the regenerating pellet 31 in the supply portion 7, delivery air or a new regenerating pellet 31 sent from the upper part is pushed forward from the upper part of the cylinder 13 for a regenerating pellet. When the virgin pellet 35 is transferred to the main cylinder 11, a pull-in motion is also carried out. By these factors for stimulation, it is possible to avoid the jamming in the middle of the cylinder 13 for a regenerating pellet.

The cylinder 15 for a virgin pellet is provided with an inclination of an angle $\beta$ which is greater than the angle $\alpha$ of the cylinder 13 for a regenerating pellet with respect to the vertical line. The inclination angle $\beta$ is set to be 30 to 60 degrees in such a manner that the regenerating pellet 31 is steadily mixed with the virgin pellet 35 without large-scaled equipment. When the cylinder 13 for a regenerating pellet has an inclination, the inclination of the cylinder 15 for a virgin pellet may be set into the same direction as or a reverse direction to the same inclination. When the angle $\beta$ is less than the lower limit of the range described above, the steadiness of the mixture of the regenerating pellet 31 and the virgin pellet 35 tends to be decreased. From this viewpoint, it is more preferable that the lower limit of the range should be equal to or greater than 35 degrees. It is further preferable that the lower limit should be equal to or greater than 40 degrees. To the contrary, also in the case in which the angle $\beta$ is greater than the range, the flow of each of the regenerating pellet 31 and the virgin pellet 35 tends to be unstable. From this viewpoint, it is preferable that the angle $\beta$ should be equal to or smaller than 55 degrees. It is more preferable that the angle $\beta$ should be equal to or smaller than 50 degrees.

Since the inclination angles are defined respectively as described above, an angle $\theta$ formed by the cylinder 13 for a regenerating pellet and the cylinder 15 for a virgin pellet is set to be 10 to 80 degrees. In respect of the more preferable combination of the inclination angles of the cylinder 13 for a regenerating pellet and the cylinder 15 for a virgin pellet, it is more preferable that the angle $\theta$ should be 20 to 70 degrees. It is preferable that the directions of the cylinder 13 for a regenerating pellet and the cylinder 15 for a virgin pellet with respect to the vertical line should be identical to each other because space occupied by the supply portion 7 can be saved. It is preferable that the angle θ should be 30 to 60 degrees in the same direction. In respect of the smooth steady mixture of the regenerating pellet 31, it is more preferable that the angle θ in the same direction should be 35 to 55 degrees. It is further preferable that the angle θ should be 40 to 50 degrees.

Figure 4:
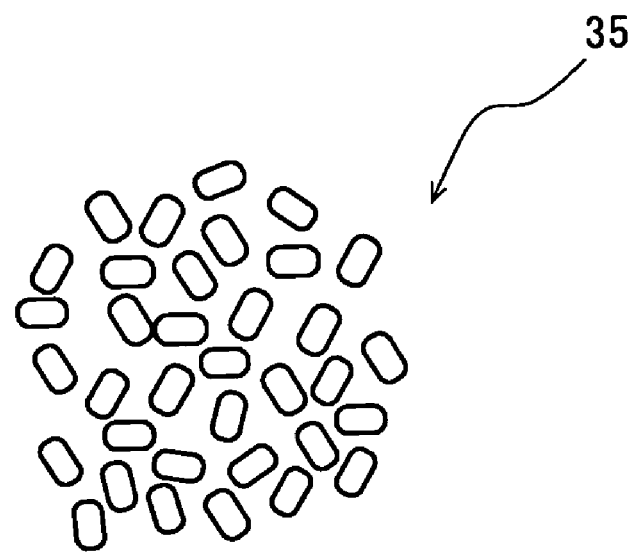
FIG. 4 is a plan view showing the shape of a resin pellet.
Figure 4:
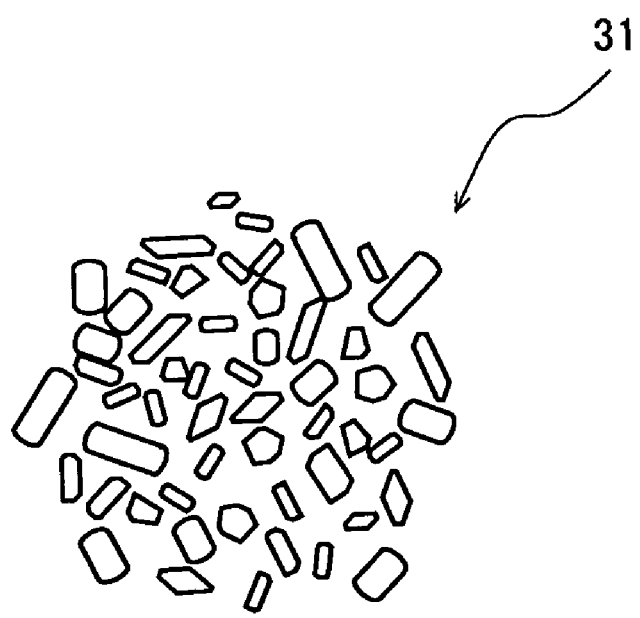
Figure 5:
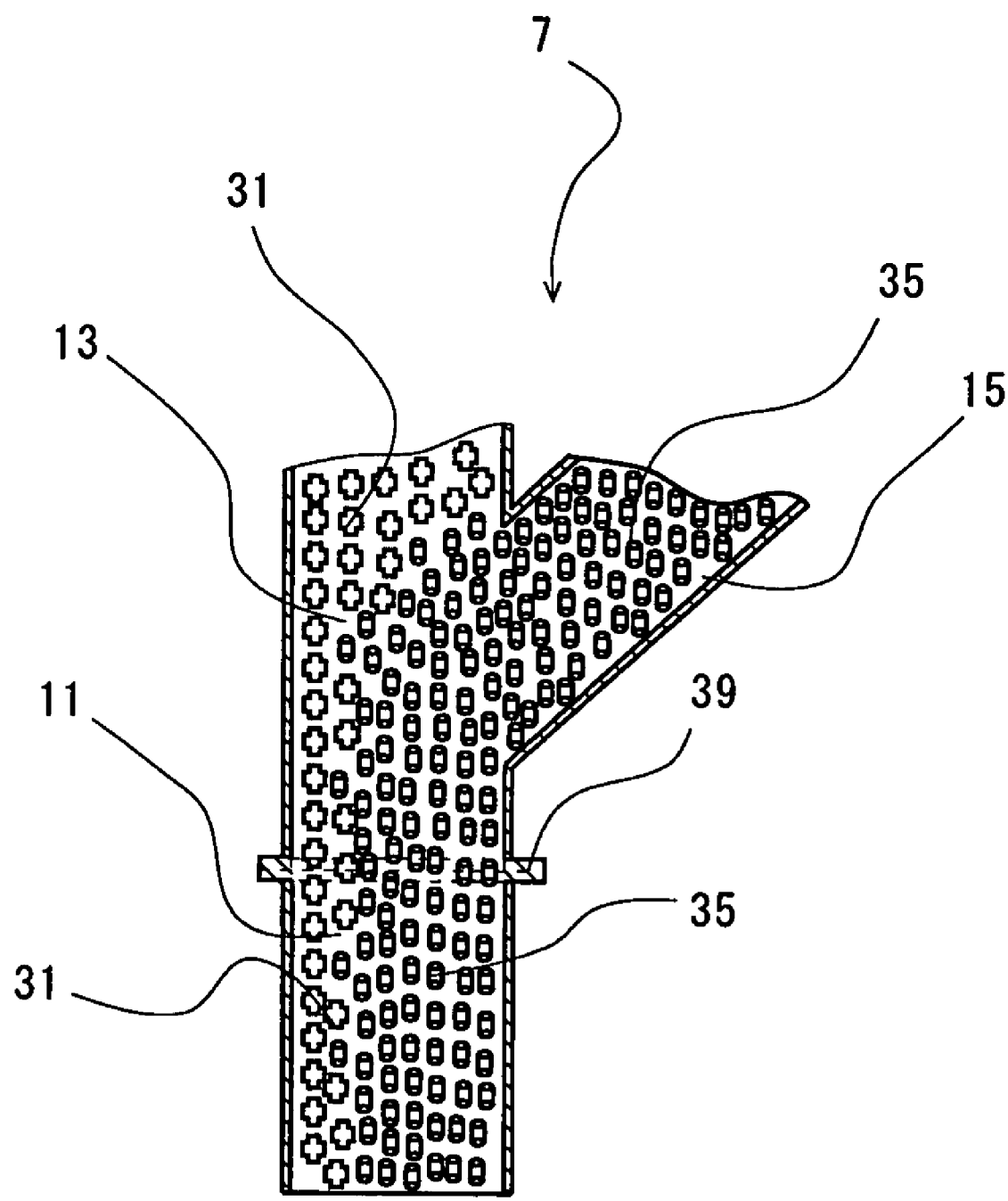
FIG. 5 is a typical sectional view showing a state in which the resin pellet is put in a main cylinder.

FIG. 4 is a plan view showing the shape of a resin pellet. FIG. 4(*a*) shows the virgin pellet 35 and FIG. 4(*b*) shows the regenerating pellet 31. The virgin pellet 35 takes a uniform shape. The regenerating pellet 31 is created by crushing. Therefore, a large number of pellets take non-constant shapes. Although the natural flow of the pellet is easily generated in the virgin pellet 35, a friction is generated comparatively readily between the pellets in the regenerating pellet 31. FIG. 5 is a typical sectional view showing a state in which the resin pellet is put in the main cylinder 11. The regenerating pellet 31 and the virgin pellet 35 in the resin pellets are shown in cross-shaped and straw bag-shaped marks, respectively. As shown in FIG. 5, the regenerating pellet 31 is dropped in a large amount close to the wall surface of the main cylinder 11 on the opposite side of the cylinder 15 for a virgin pellet. The virgin pellet 35 makes up for the deficiency of the regenerating pellet 31 as the resin pellet at an inclined angle to the main cylinder 11.

In order to maintain the steady supply of the virgin pellet 35, it is preferable that the residual amount of the virgin pellet 35 in the cylinder 15 for a virgin pellet should be detected. As detecting means, for example, a photoelectric tube 39 is used as shown in FIGS. 1 and 3. It is more preferable that the residual amount should be detected, and furthermore, equipment should be provided to control the supply of the virgin pellet 35 based on this signal. It is preferable that a shutter 41 should be provided to prepare for the case in which the contents of the main cylinder 11 are to be consumed for the replacement of a material, repair, overhaul and the like.

With the progress of the material and structure of the golf ball, a cover and a mid layer are to be formed thinly and uniformly in many cases. In case of a thin layer which is formed, the residue is generated in a large amount. If the ratio of the residue to the virgin resin is increased, a process control is required with higher precision. The reason is that a material is apt to be altered due to a moisture absorption, an oxidation or the like with the passage of time depending on a type thereof. For storing such a material, a great deal of time and labor such as a place for the storage or an environmental control is required. If the residue is more increased, quality depending on the error of the mixing rate of the residue and a workability in a process are easily influenced. As described above, in the supply portion 7, the generated residue 27 is incorporated into a forming cycle and mixing is carried out at a constant rate for use. The golf ball manufacturing apparatus comprising the supply portion 7 can solve the problems described above, and is particularly suitable for more advanced manufacture of a golf ball. In addition, in the supply portion 7, it is possible to make the most of a gravity by using an energy and electrical and mechanical devices as rarely as possible.

According to the golf ball manufacturing apparatus 1, the regenerating pellet is consumed steadily at a constant blending rate as described above. Therefore, it is possible to stably produce a golf ball of high quality. The manufacturing apparatus does not comprise a large-scaled control device but is simplified and operated smoothly. Equipment can be fabricated at a low cost and a maintenance can easily be carried out. Accordingly, the productivity of the golf ball can be enhanced and the quality can be uniform.

What is claimed is:

1. A golf ball manufacturing apparatus comprising:
   a mold including a cavity for forming a golf ball;
   an injection molding machine for supplying a molten resin to the mold;
   a supply portion for supplying a resin pellet to the injection molding machine; and
   a crushing machine for crushing a residue discharged from the mold, thereby preparing a regenerating pellet, wherein
   the supply portion includes a main cylinder, and a cylinder for a regenerating pellet and a cylinder for a virgin pellet which branch upward from the main cylinder,
   an inclination angle α to a vertical line of the cylinder for a regenerating pellet is equal to or smaller than 20 degrees,
   an inclination angle β to a vertical line of the cylinder for a virgin pellet is 30 to 60 degrees,
   the crushing machine is coupled to the cylinder for a regenerating pellet, and the regenerating pellet is transferred from the crushing machine to the main cylinder through the cylinder for a regenerating pellet and
   in the cylinder for a regenerating pellet, the regenerating pellet is transported by gravity, and in the cylinder for a virgin pellet, the virgin pellet is transported by gravity.

2. The golf ball manufacturing apparatus according to claim 1, wherein an angle θ formed by the cylinder for a regenerating pellet and the cylinder for a virgin pellet is 20 to 70 degrees.

3. The golf ball manufacturing apparatus according to claim 1 or 2, wherein the cylinder for a virgin pellet is provided with a detecting device for detecting a residual amount of a virgin pellet.

4. The golf ball manufacturing apparatus according to claim 1 or 2, wherein the inclination, if any, of the cylinder for a regenerating pellet and the inclination of the cylinder for a virgin pellet arc in the same direction relative to a vertical line.

\* \* \* \* \*